March 20, 1956  T. S. SKILLMAN  2,738,867
ARTICLE TRANSFER ARRANGEMENTS
Filed Nov. 20, 1951  10 Sheets-Sheet 1

FIG. 1

Inventor
Thomas S. Skillman
By Ward, Crosby & Neal
Attorneys

FIG. 2

March 20, 1956 T. S. SKILLMAN 2,738,867
ARTICLE TRANSFER ARRANGEMENTS
Filed Nov. 20, 1951 10 Sheets-Sheet 4

FIG. 4

Inventor
Thomas S. Skillman
By Ward, Crosby & Neal
Attorneys

March 20, 1956 T. S. SKILLMAN 2,738,867
ARTICLE TRANSFER ARRANGEMENTS
Filed Nov. 20, 1951 10 Sheets-Sheet 6

FIG. 6

Inventor
Thomas S. Skillman
By Ward, Crosby & Neal
Attorneys

Inventor
Thomas S. Skillman
By Ward, Crosby & Neal
Attorneys

United States Patent Office 2,738,867
Patented Mar. 20, 1956

2,738,867

ARTICLE TRANSFER ARRANGEMENTS

Thomas S. Skillman, Mosman, near Sydney, New South Wales, Australia, assignor to Punch Engineering Pty. Limited, Cammeray, near Sydney, New South Wales, Australia, a corporation of New South Wales, Australia Application November 20, 1951, Serial No. 257,280

Claims priority, application Australia December 18, 1950

12 Claims. (Cl. 198—32)

The invention relates to article transfer arrangements and more particularly to arrangements for the transfer of articles released from storage in article dispensing systems.

In article dispensing systems one problem which has to be solved consists in the transfer of articles released from storage to a final delivery position. If the articles are normally stored in shelves which are arranged in columns and rows, the released articles come out of the shelves on various horizontal levels and have to be collected from these levels and transported to a suitable delivery position on a level different from the release levels of the various articles. Although the collection of articles on individual levels can easily be achieved by conveyor belts passing along the various shelves from which the articles are released, more complicated arrangements are necessary to take the articles from these horizontal conveyor belts and to transfer them to the belt or to the other conveying means which transport the articles to a delivery position.

Various arrangements have been used to transfer articles from different levels to a common level but these arrangements have the disadvantage that valuable time is lost in the transfer of selected articles which thus slows down the operation of the whole article dispensing system. For example, a spiral arrangement may be used, in which the articles from horizontal conveyor belts are transferred to inclined conveyor belts which lead the articles by changing their direction under a certain slope down to a common conveyor and to the delivery position. For articles which are discharged on levels below the delivery position, similar arrangements have been proposed to bring the articles to the lowest level and then to raise the articles to the level of the delivery position by elevator belts or the like.

It is an object of the invention to provide a transfer arrangement which rapidly transfers the articles from the various levels from which they are released to the final delivery level.

According to the invention, article carriers associated with different levels are positioned at these different levels for the simultaneous collection therefrom, and are movable by driving means to transport these articles to arrive simultaneously at a common level, e. g., the level of delivery position.

According to another feature of the invention the transfer arrangement has rigid supporting members carrying the article carriers corresponding to the different levels. The article carriers are spaced along the length of the supporting members, are moved simultaneously between their different levels and the common level and are arranged to arrive simultaneously at that common level. Means are provided at the different levels to transfer articles on to the corresponding carriers and further means are provided to transfer articles from the carriers to a conveyor at the common level.

According to a further feature of the invention the article carriers are fitted with individually-driven conveyor belts to collect the articles and to discharge them on to the common conveyor. Blocking devices at the carriers prevent articles from leaving the carriers before they arrive at the common conveyor.

It is another feature of the invention to increase the capacity of the apparatus considerably by arranging two separate groups of carriers so that one can collect articles while the other is discharging.

A still further feature of the invention is to provide separate sets of supporting members for the carriers associated with alternate levels and to move these members in opposite directions to reach the common level, thus permitting the different levels to be more closely spaced than in other schemes.

Another feature of the invention is to provide blocking devices adjacent to the article transfer arrangement at the different levels so that articles conveyed thereto may be held until an article carrier is ready to accept them.

Various embodiments of the invention will hereafter be described.

Figure 1:
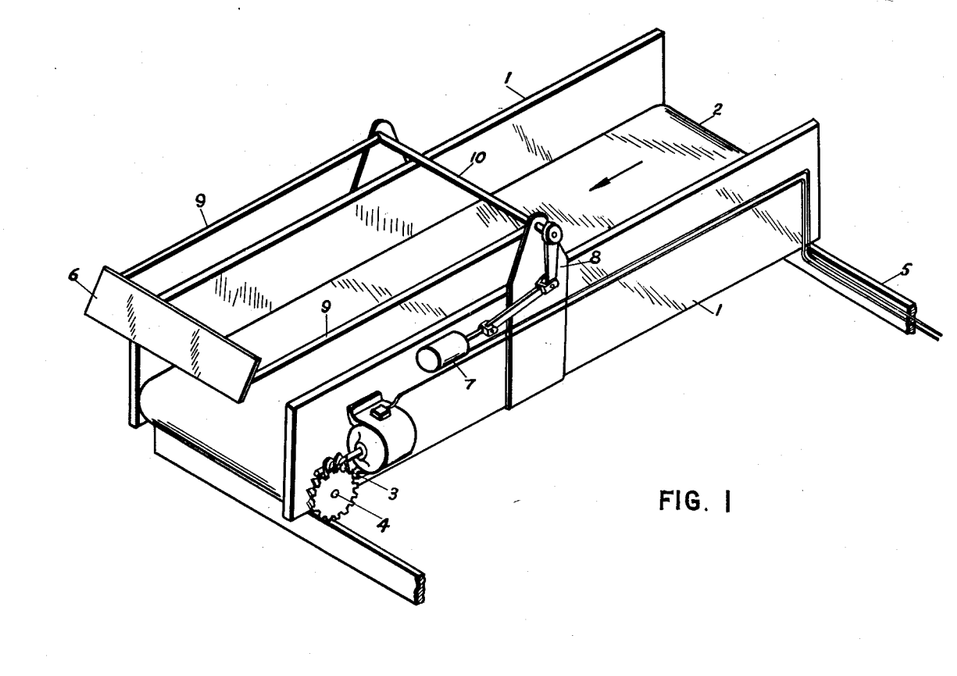
Fig. 1 shows an article carrier which may be used with any of the embodiments.

The various embodiments of the invention make use of a series of article carriers as shown in Fig. 1. Each article carrier comprises a tray with sides 1, carrying rollers at each end, around which runs a conveyor belt 2. The conveyor belt 2 may be driven as required by means of an electric motor and gearing 3 on the shaft 4 of the front rollers. Arms 5 supporting the sides 1 serve to attach the article carrier to supporting members, as will be described later on.

When articles are loaded on to the rear of the article carrier they are brought forward by the belt 2 and are prevented from leaving the front of the belt by a blocking device with the blocking member 6. This blocking member normally rests on the belt 2 at the front of the tray, but in Fig. 1 it is shown in the position to which it can be raised by operation of the solenoid 7 and the crank and linkage 8, which rotate the supporting arms 9 about shaft 10. When the blocking device is thus raised, articles which have been collected behind it are discharged from the front of the tray by conveyor belt 2.

When used in an article transfer arrangement this article carrier is raised or lowered until it is opposite a conveyor at a particular level and collects articles transferred on to it by that conveyor. It is then brought to the level of a common conveyor, where the blocking device 6 is raised, so that the articles can be discharged on to the common conveyor.

Figure 2:
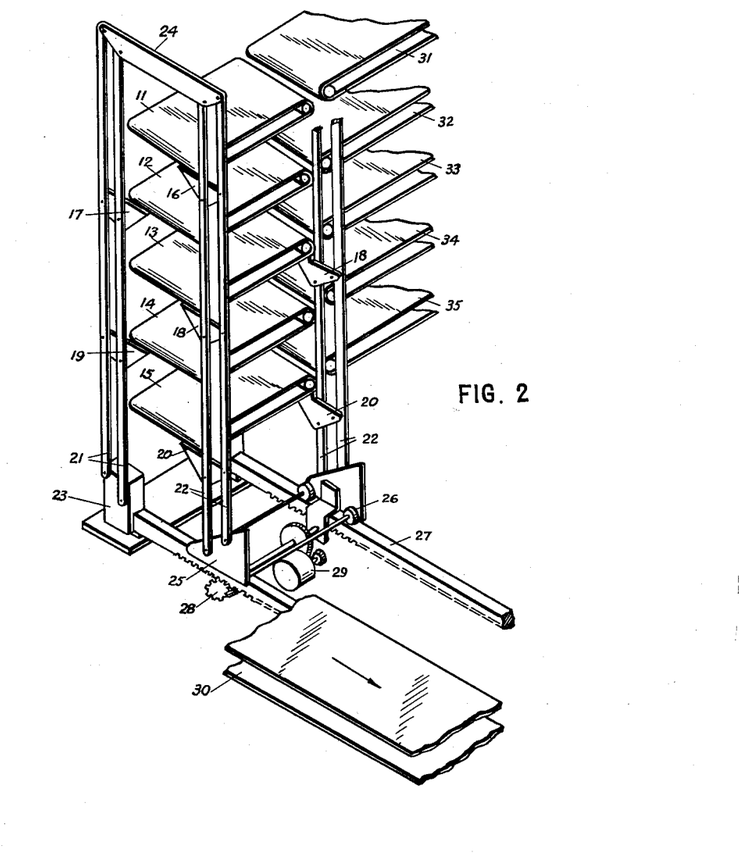
Figs. 2 and 3 show an article transfer arrangement according to the invention in which two sets of carriers each mounted on rigid supports, are moved apart and downwards to bring all carriers from different levels to a common level.

Such an article transfer arrangement is, for example, shown in Fig. 2. Details of the article carrier and the blocking device shown in Fig. 1 have been omitted for clarity but the belts 2 of Fig. 1 are represented by the belts 11—15 in Fig. 2 and the arms 5 of Fig. 1 are represented by the arms 16—20 in Fig. 2. Arms 16—20 are attached to and support sides 1 (not shown in Fig. 2). These supporting arms of the article carriers 12 and 14 are pivotally attached to rigid supporting members 21 and the supporting arms of the article carriers 11, 13 and 15 are attached to the rigid supporting members 22, the pairs of pivots being arranged, as shown, in parallel relationship.

The members 21 are pivoted at their lower ends to a fixed base 23 and at their upper ends to cross members 24, these pairs of pivots being parallel to the pairs of pivots of the article carriers. The upper ends of the members 22 are also pivoted in similar manner to the cross members 24 and the lower ends to a movable carriage 25. The carriage 25 has wheels 26 which permit it to run along rails 27 and is moved along these rails by a rack and pinion arrangement 28 driven by motor 29.

Figure 3:
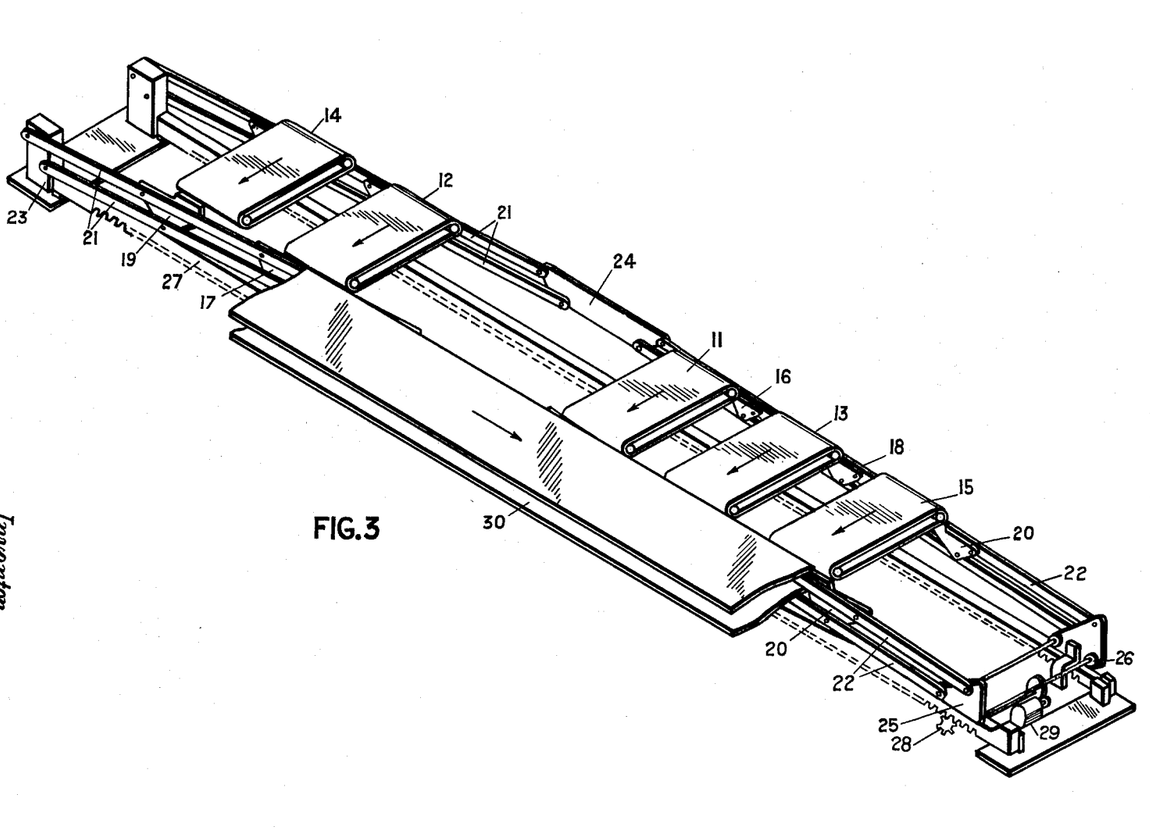

The arrangement of the pivots on the supporting members 21 and 22 is such that when the carriage 25 moves to the right the lower ends of these members separate and the cross member 24, which always remains parallel to the rails 27, moves across and down, until the apparatus reaches the position shown in Fig. 3 in which the carriage 25 has moved out until the supporting members 21 and 22 and the cross member 24 lie almost in a straight line. In this position the belts 11—15 are in positions to discharge articles on to the common conveyor 30, which transports the articles to a delivery position.

Referring again to Fig. 2, articles which may be released from known storage devices travel on conveyor belts 31—35 at different levels and are transferred to the belts 11—15, each of which is approximately at the same horizontal level as one of the corresponding belts 31—35. The blocking devices, which are not shown in Fig. 2 but are described in connection with Fig. 1, prevent the articles falling from the front end of belts 11—15. Motor 29 is now operated to lower the apparatus to the level of the common delivery belt 30. The blocking members 6 (Fig. 1) are raised, permitting the articles to be transferred from belts 11—15 to belt 30, at which common level they are conveyed to a delivery point. Motor 29 then reverses and restores the apparatus ready to collect further articles.

The belts 31—35 may be fitted with blocking devices similar to those on the article carriers, so that articles may be permitted to reach the ends of these belts during the time that the belts 11—15 are travelling to and from the horizontal position. These devices are raised when the belts 11—15 are opposite belts 31—35, thus permitting articles to transfer on to the belts 11—15.

To increase the speed in the transfer of articles a second group of article carriers can be provided, arranged so that one group may be collecting articles for one batch while the second group is discharging articles of another batch on to the common delivery belt.

Figure 4:
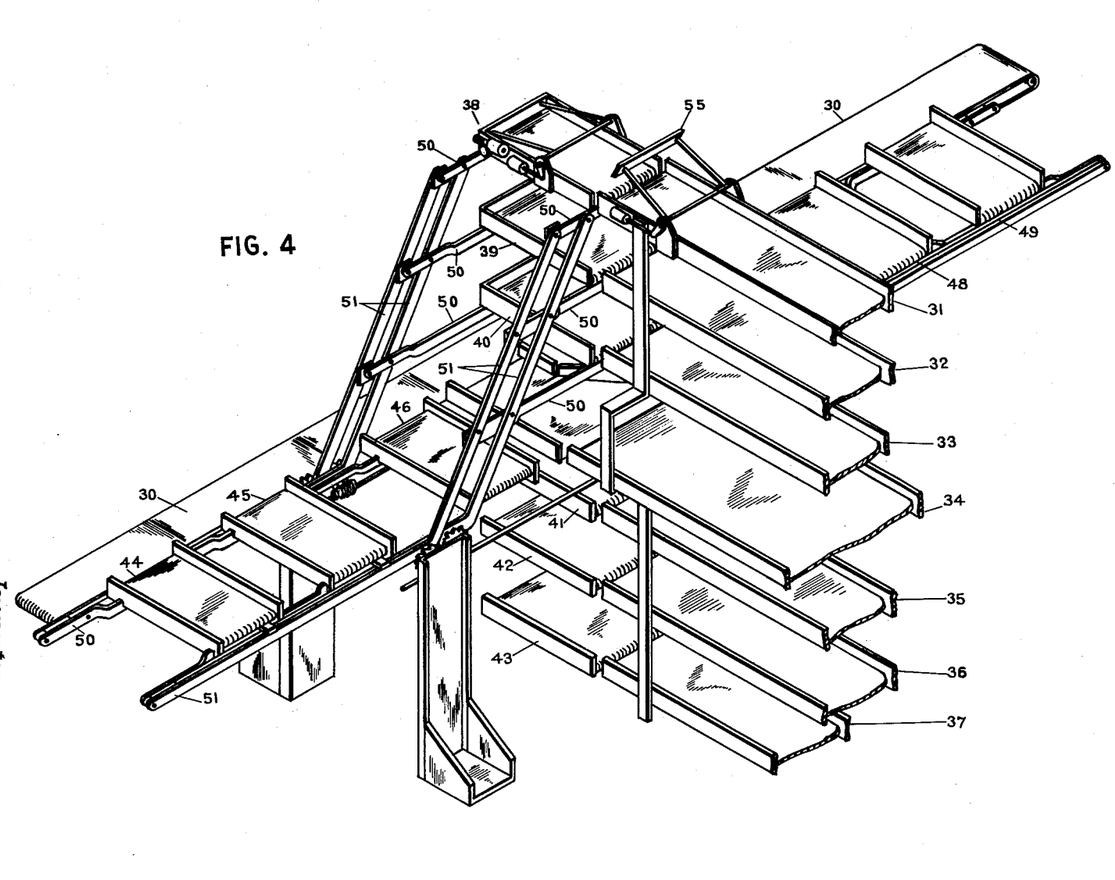
Figs. 4 and 5 show another embodiment of the invention in which one set of carriers collects articles from different levels while another set of carriers discharges articles at a common level.
Figure 5:
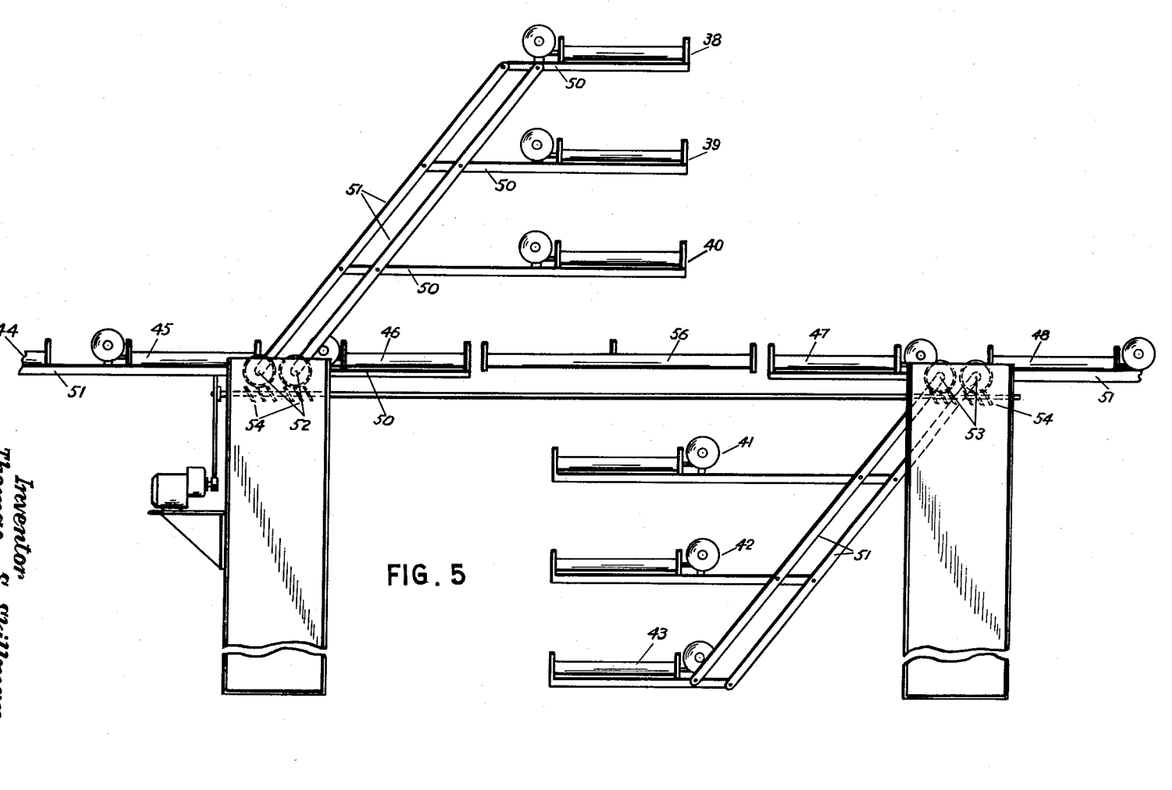

Such an arrangement is shown in Figs. 4 and 5 where article carriers 38—43 are in position opposite the conveyor belts 31—33 and 35—37 and the article carriers 44—49 are in position to discharge articles on to the common conveyor 30 (the carrier 47 cannot be seen in Fig. 4 as it is hidden by the conveyors 31—33).

Figure 6:
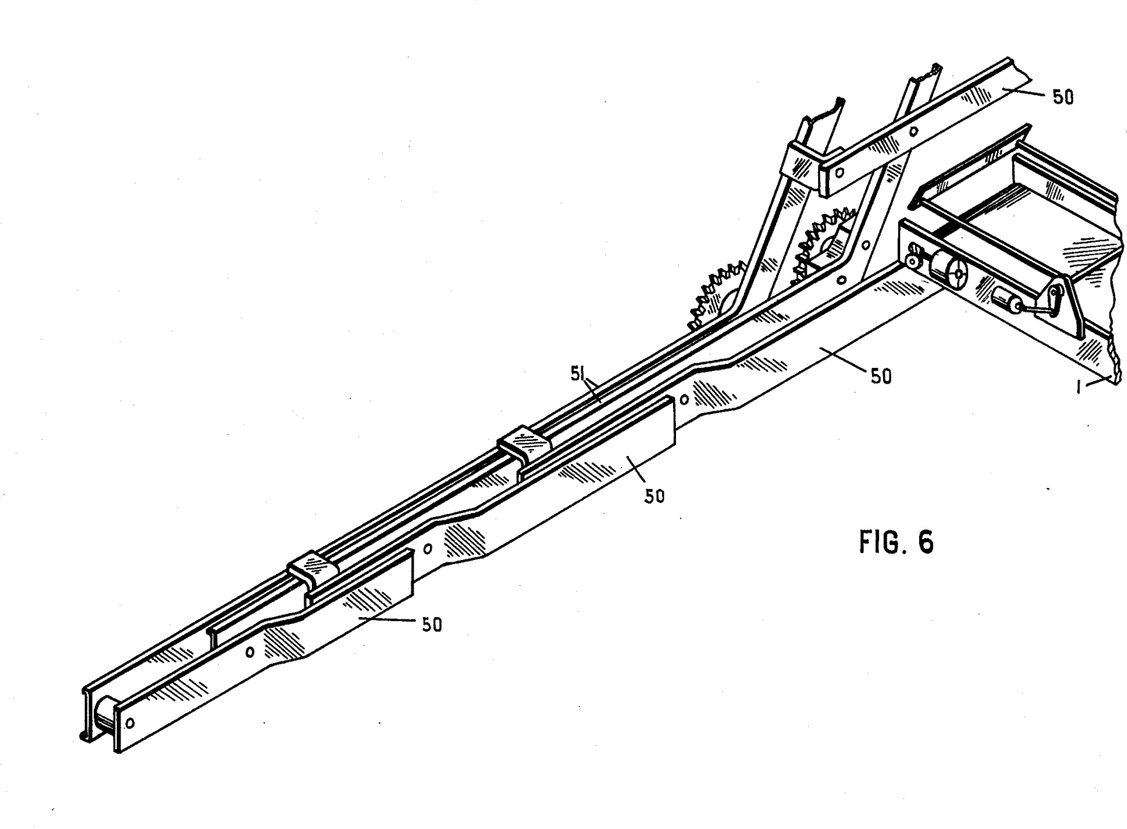
Figs. 6 and 7 show further details of the arrangement shown in Figs. 4 and 5.

The article carriers used in this embodiment may be the same as those shown in Fig. 1 and are supported by arms 50 from members 51. The members 51 supporting through arms 50 a set of carriers 38, 39 and 40 are rigidly joined at an obtuse angle, for example 130 degrees, to the members 51 supporting through arms 50 another set of carriers 44, 45 and 46, these two sets forming one group. A similar relationship exists between the sets of carriers 41, 42 and 43, and 47, 48 and 49. The arms 51 are arranged so that their horizontal portions lie one behind the other, as shown in Fig. 6. By means of the gearing 54, which includes gear wheels attached to the members 51, these members and thus the two groups of carriers may be rotated about the pivots 52 and 53 respectively.

From the position shown in Fig. 5 the members will be rotated in an anti-clockwise direction through approximately 130 degrees, which brings the article carriers 38, 39 and 40 into the position previously occupied by the carriers 44, 45 and 46, and lowers the carriers 44, 45 and 46 into the position previously occupied by carriers 43, 42 and 41, respectively. The carriers 43, 42 and 41 will have moved away by this time, since the members to which these carriers are attached rotate at the same time about the pivots 53, and will have taken up the positions previously occupied by carriers 49, 48 and 47, which in turn have replaced carriers 38, 39 and 40 respectively. (Carrier 49 is not shown in Fig. 5 but is shown in Fig. 4.)

Thus the carriers which were opposite the conveyors at different levels are now opposite the common conveyor and vice versa. When the appropriate carriers have collected or delivered their articles the members 51 are rotated clockwise to take up their former positions.

As described in connection with the previous embodiment, blocking devices may be used not only on the article carriers but also on the conveyors at the various levels to control the flow of goods therefrom. Such a blocking device is, for example, shown by 55 in Fig. 4.

Figure 7:
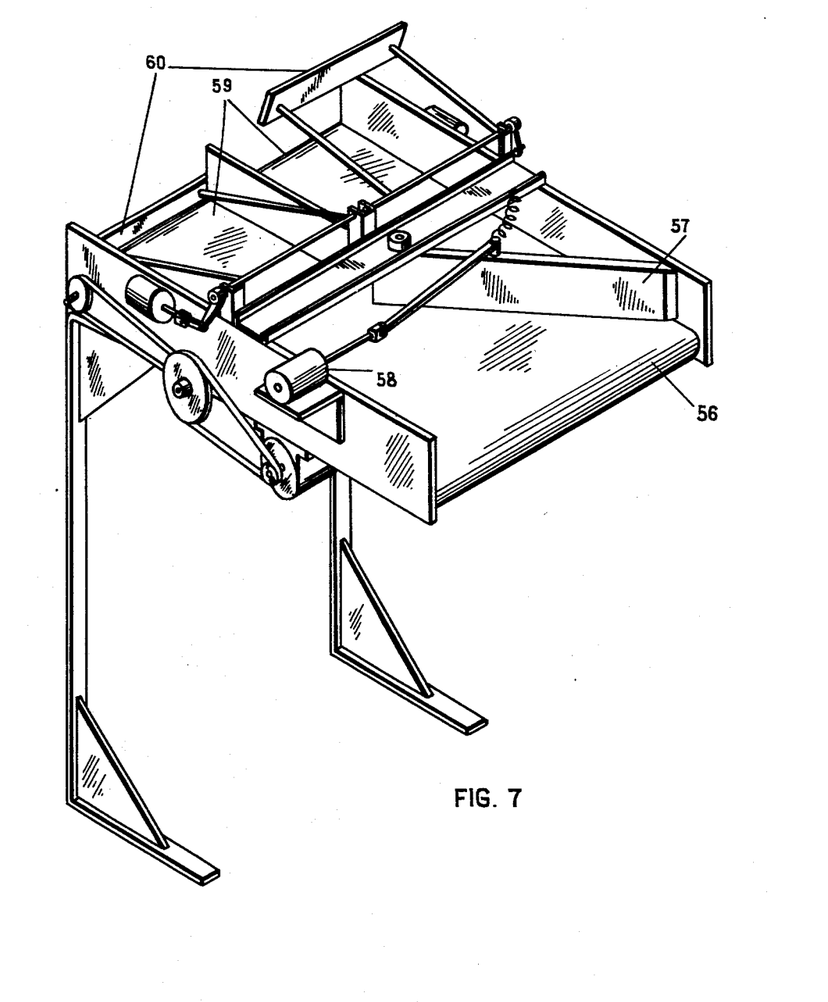

The conveyor 34 in Fig. 4 is at approximately the same level as the common conveyor and the scheme shown in Fig. 7 is adopted to release the articles from this level. The belt 34 discharges on to a short belt 56, which is fitted with a diverter 57 operated by a solenoid 58. This diverter guides the articles into one of two separate compartments 59 where they are held by one of the blocking members 60. When the article carriers come into position to collect and discharge articles, one of the blocking members 60 releases the articles held by it permitting the articles to be transferred to the common conveyor, while the diverter 57 opens the opposite compartment 59 to receive the articles of the next batch. Thus the articles from this level are released together with those from the other levels belonging to the same batch.

The embodiments so far described discharge all articles at one common level. It may happen that with two groups of article carriers, batches of articles will be discharged so closely together that they mix on the common conveyor. To avoid this, an arrangement as shown in Figs. 8, 9 and 10 may be used.

Figure 8:
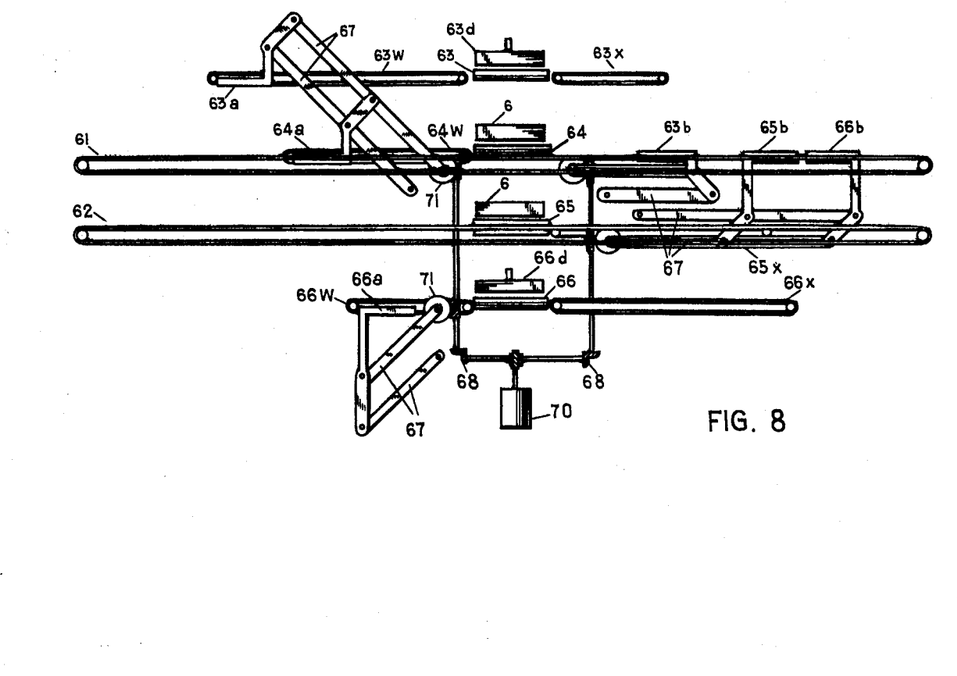
Figs. 8, 9 and 10 show a further embodiment in which articles are discharged from the carriers at two different levels.
Figure 9:
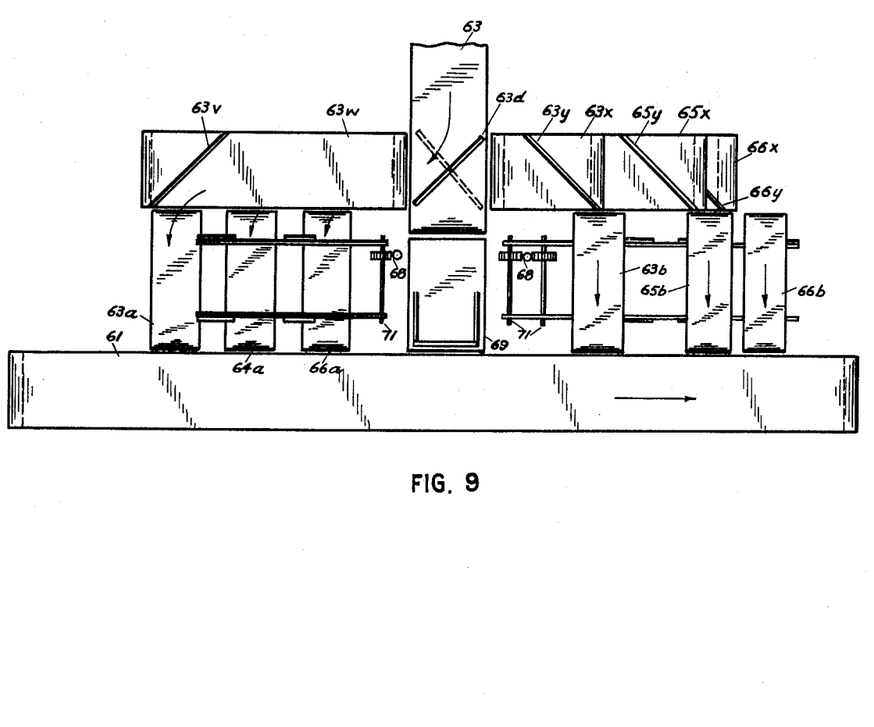
Figure 10:
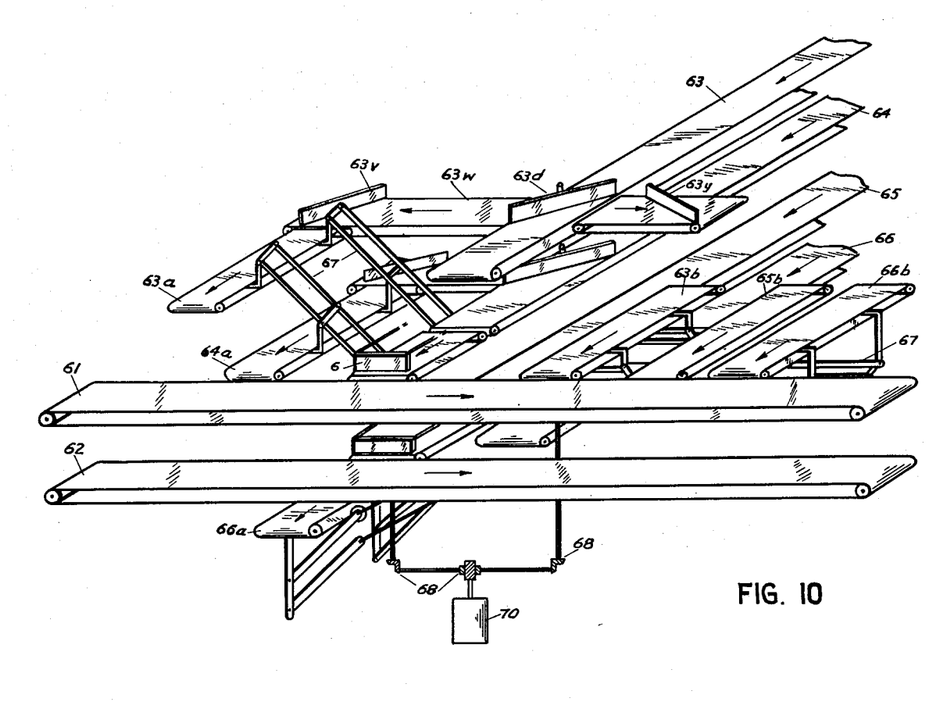

Figs. 8 and 10 show two common conveyors 61 and 62 and four conveyors 63, 64, 65 and 66 at different levels. Two groups of article carriers, similar to those previously described, are indicated by the belts 63a, 64a and 66a, and 63b, 65b and 66b respectively. In the positions shown in Fig. 8 articles are loaded on to carriers 63a, 64a and 66a from the transverse conveyors 63w, 64w and 66w respectively. This is more clearly seen in the plan view (Fig. 9) and in the perspective view (Fig. 10) in which articles arriving along conveyor 63 are diverted by a diverter 63d on to the transverse conveyor 63w and thence by a diverter 63v to the article carrier 63a, and similarly for articles in conveyors 65 and 66. The arrangement for articles on conveyor 64 is described below. The article carriers are supported by arms 67, pivoted at points 71, and are moved by shafts and gearing 68 which bring the carriers 63a, 64a and 66a to the level of conveyor 62 and at the same time bring the carriers 63b, 65b and 66b to the levels of conveyors 63, 65 and 66 respectively. It will be seen that in this embodiment article carriers 63a and 64a are connected to the one set of supporting members 67, whereas article carrier 66a is individually connected to another set of supporting members 67. Both sets are pivoted separately but are operated by the same driving shaft. A similar arrangement exists for the set of article carriers 65b and 66b, and 63b respectively.

While the carriers 63a, 64a and 66a discharge on to conveyor 62, carriers 63b, 65b and 66b are loaded from the conveyors 63, 65 and 66 pass diverters such as 63d in a changed position by means of transverse conveyors 63x, 65x and 66x and diverters 63y, 65y and 66y respectively. The diverters such as 63d are moved each time the article carriers change their position to divert articles, coming along on the belts 63, 64, 65 and 66, alternately to one or the other set of article carriers.

Since the conveyors 64 and 65 are at the same levels as the common conveyors 61 and 62, the arrangement is modified at these levels so that articles to be discharged at the same level are permitted to continue on to a corresponding short conveyor 69 and are released on to the corresponding common conveyor by operation of a blocking member 6 when required. The blocking member 6 and its driving mechanism are similar to the device described in conjunction with Fig. 1. A diverter on conveyor 64 either diverts articles to transverse conveyor 64w or allows them to pass onto associated conveyor 69, and a diverter on conveyor 65 either diverts articles to transverse conveyor 65x or allows them to pass onto associated conveyor 69.

The shafts and gearing 68 may be driven by motor 70, and the control of this drive and of the diverters 63d and blocking members 6 may be effected either manually or by automatic arrangements.

The foregoing description shows only some particular embodiments of the invention. The transfer arrangements can serve any other number of levels in the same way as described above and the article carriers can be connected in various ways. Instead of moving the blocking members 6 upwards to release the articles, these blocking members can be hinged at the bottom and lowered when required to form a bridge between the article carriers and the conveyor belts, using a similar mechanism for their operations as described before. Although the article carriers are shown as trays equipped with movable belts, in some cases they may be replaced by inclined trays so that the articles slide off the trays to a common conveyor as soon as the blocking members are removed. These and other modifications can be made without departing from the spirit of the invention.

I claim:

1. An arrangement for the transfer of articles from different levels to a common level comprising: a plurality of discharge devices positioned at said different levels; conveying means positioned at said common level; article carriers individually associated with said discharge devices; movable supporting means common to said article carriers and adapted to place all said article carriers simultaneously in juxtaposition alternately with their corresponding discharge devices at said different levels and with said conveying means at said common level; driving means for said supporting means; means to prohibit the discharge of articles from said discharge devices except when said article carriers are in juxtaposition with their corresponding discharge devices; transfer means to transfer articles from said article carriers to said conveying means; and means to prohibit the transfer of articles from said article carriers except when said article carriers are in juxtaposition with said conveying means.

2. An arrangement for the transfer of articles from different levels to a common level comprising: a plurality of discharge devices positioned at said different levels; conveying means positioned at said common level; article carriers individually associated with said discharge devices; movable supporting means including two sets of rigid members, one of said sets supporting the article carriers associated with the discharge devices at alternate levels, the other of said sets supporting the article carriers associated with the discharge devices at the remaining levels, said sets of rigid members being adapted to place all said article carriers simultaneously in juxtaposition alternately with their corresponding discharge devices at said different levels and with said conveying means at said common level for receiving articles from said discharge devices and for transferring said articles to said conveying means; driving means for said supporting means to move said sets of rigid members alternately apart and together; means to prohibit the discharge of articles from said discharge devices except when said article carriers are in juxtaposition with their corresponding discharge devices; transfer means to transfer articles from said article carriers to said conveying means; and means to prohibit the transfer of articles from said article carriers except when said article carriers are in juxtaposition with said conveying means.

3. An arrangement for the transfer of articles from different levels to a common level comprising: a plurality of discharge devices positioned at said different levels; conveying means positioned at said common level; article carriers individually associated with said discharge devices; movable supporting means including two sets of rigid members, one of said sets supporting the article carriers associated with the discharge devices at alternate levels, the other of said sets supporting the article carriers associated with the discharge devices at the alternate levels, the other of said sets supporting the article carriers associated with the discharge devices at the remaining levels, said sets of rigid members being adapted to place all said article carriers simultaneously in juxtaposition alternately with their corresponding discharge devices and with said conveying means; driving means including a rack and pinion device to move said sets of rigid members apart from a substantially vertical position to a substantially horizontal position and alternately move said sets of rigid members together from said substantially horizontal position to said substantially vertical position; means to prohibit the discharge of articles from said discharge devices except when said article carriers are in juxtaposition with their corresponding discharge devices; transfer means to transfer articles from said article carriers to said conveying means; and means to prohibit the transfer of articles from said article carriers except when said article carriers are in juxtaposition with said conveying means.

4. An arrangement for the transfer of articles from different levels to a common level comprising: a plurality of discharge devices positioned at said different levels, said discharge devices being arranged in two groups, one of said groups being positioned above said common level, the other of said groups being positioned below said common level; conveying means positioned at said common level; a plurality of article carriers arranged in two groups, each of said last mentioned groups including one article carrier for each of said plurality of discharge devices, said article carriers in each of said last mentioned groups being arranged in two sets; supporting means comprising rigid members associated with each set of each of said groups of article carriers, the rigid members of one set of each group being angularly displaced and permanently joined to the rigid members of the other set of the same group, the junction point being pivoted at said common level; driving means operable to simultaneously oscillate the angularly displaced rigid members of each of said groups of article carriers, said rigid members of each group being adapted to place simultaneously one set of article carriers in juxtaposition with one group of discharge devices and the other set in juxtaposition with said conveying means; means to prohibit the discharge of articles from any said discharge device except when one of said article carriers is in juxtaposition therewith; transfer means to transfer articles from said article carriers to said conveying means; and means to prohibit the transfer of articles from any said article carrier except when such article carrier is in juxtaposition with said conveying means.

5. An arrangement for the transfer of articles according to claim 4 and having an additional discharge device positioned at said common level, said additional discharge device having two separate outlets in juxtaposition to said conveying means at said common level; a diverter to direct articles alternately to one or the other of said outlets; blocking means operable to block alternately one or the other of said outlets; and additional driving means for said diverter and said blocking means and operable in fixed relationship to said driving means of said rigid members.

6. An arrangement for the transfer of articles from different levels to a common level comprising: a plurality of discharge devices positioned at said different levels in two groups, one above and one below said common level; conveying means positioned at said common level; a plurality of article carriers arranged in two groups, each of said last mentioned groups including one article carrier for each of said plurality of discharge devices, said article carriers in each of said last mentioned groups being arranged in two sets; supporting means comprising for each set of each of said groups of article carriers two sets of parallel bars, the bars of each set being linked by parallel crosspieces to support the corresponding article carriers, and being pivoted separately at said common level, the bars of each set of a group of article carriers being displaced at an obtuse angle and permanently joined at said common level with the corresponding bars of the other set of said group of article carriers; driving means operable to simultaneously oscillate the angularly displaced bars of each of said groups of article carriers, said bars with said crosspieces being adapted to maintain throughout the movement the article carriers continuously in a horizontal position and to place simultaneously one set of article carriers in juxtaposition with one group of discharge devices and the other set in juxtaposition with said conveying means; means to prohibit the discharge of articles from any said discharge device except when one of said article carriers is in juxtaposition therewith; transfer means to transfer articles from said article carriers to said conveying means; and means to prohibit the transfer of articles from any said article carrier except when such article carrier is in juxtaposition with said conveying means.

7. An arrangement for the simultaneous transfer of articles from different levels alternately to one or the other of two common levels comprising: conveying means positioned at two common levels; a plurality of discharge devices positioned at different levels including said common levels; article carriers including transfer means to receive articles from said discharge devices and to transfer said articles to said conveying means; movable supporting means including two groups of rigid members; and driving means for said supporting means to move said two groups of rigid members in fixed relationship to each other; said of said groups of rigid members supporting a plurality of said article carriers so arranged that on movement of said supporting means the article carriers of one of said groups are brought simultaneously into juxtaposition with corresponding discharge devices at all levels different from one of said common levels, while the article carriers of the other of said groups are moved simultaneously to said one common level, and alternately the article carriers of said other group are brought simultaneously into juxtaposition with corresponding discharge devices at all levels different from the other of said common levels while the article carriers of said one group are moved simultaneously to said other common level.

8. An arrangement for the transfer of articles according to claim 7 and including: movable diverters associated with said discharge devices at said different levels; the diverters of the discharge devices at said common levels directing articles alternately to the conveying means of the corresponding common level and the group of article carriers associated with the other of said common levels, the diverters of all other of said discharge devices directing articles alternately to article carriers of one or the other of said groups; blocking means associated with the discharge devices at said common levels; and additional driving means for said diverters and said blocking means operable in fixed relationship to said driving means of said supporting means to transfer articles simultaneously from said article carriers to corresponding conveying means at said common levels.

9. An arrangement for the simultaneous transfer of articles from different levels alternately to one or the other of two common levels comprising: conveying means positioned at two common levels; a plurality of discharge devices positioned at different levels including said common levels; said conveying means being positioned below the highest level and above the lowest level of said discharge devices; article carriers including transfer means to receive articles from said discharge devices and to transfer said articles to said conveying means; movable supporting means including two groups of rigid members, each group being associated with one of said conveying means; and driving means for said supporting means to move said two groups of rigid members in fixed relationship to each other; each of said groups of rigid members supporting a plurality of article carriers arranged in two sets, one set of article carriers being movable to receive articles simultaneously from the discharge devices above a corresponding common level, the other set of article carriers being movable simultaneously to receive articles from the discharge devices below said corresponding common level, said driving means moving said rigid members supporting each of said sets of article carriers in each of said groups in opposite directions to bring said sets of article carriers simultaneously down and up respectively from different levels to said corresponding common level.

10. An arrangement for the simultaneous transfer of articles from different levels alternately to one or the other of two common levels comprising: conveying means positioned at two common levels; a plurality of discharge devices positioned at different levels including said common levels; said conveying means being positioned below the highest level and above the lowest level of said discharge devices; article carriers including transfer means to receive articles from said discharge devices and to transfer said articles to said conveying means; movable supporting means including two groups of rigid members, each group being associated with one of said conveying means; and driving means for said supporting means to move said two groups of rigid members in fixed relationship to each other; each of said groups of rigid members supporting a plurality of article carriers arranged in two sets, the rigid members supporting each set of article carriers comprising two sets of two parallel bars, the two bars of each of said last mentioned sets being arranged parallel to each other, pivoted at separate points, and connected by parallel cross-pieces fixed to said two bars along lines parallel to the connection line of said pivot points, said crosspieces supporting said sets of article carriers, one of said last mentioned sets being movable to receive articles simultaneously from the discharge devices above a corresponding common level, the other of said last mentioned sets being movable simultaneously to receive articles from the discharge devices below said corresponding common level, said driving means moving said parallel bars carrying each of said sets of article carriers in each of said groups in opposite directions to bring said sets of article carriers simultaneously down and up respectively from different levels to said corresponding level.

11. An arrangement for the transfer of articles from different levels to a common level comprising: a plurality of discharge devices positioned at said different levels; conveying means positioned at said common level; article carriers individually associated with said discharge devices, each of said article carriers including a movable belt operable to transfer articles from a corresponding discharge device to said article carrier, and a blocking device to hold said articles on said article carrier; movable supporting means common to said article carriers and adapted to place all said article carriers simultaneously in juxtaposition alternately with their corresponding discharge devices at said different levels and with said conveying means at said common level; and driving means for said supporting means, said movable belts, and said blocking devices to remove said blocking devices when said article carriers reach said common level to permit the transfer of articles by said movable belts from said article carriers to said conveying means.

12. An arrangement for the transfer of articles from different levels to a common level comprising: a plurality of first conveying means positioned at said different levels; second conveying means positioned at said common level; a blocking device associated with each of said first conveying means to prevent the release of articles therefrom; article carriers individually associated with said first conveying means; movable supporting means common to said article carriers and adapted to place all said article carriers simultaneously in juxtaposition alternately with their corresponding first conveying means at said different levels and with said second conveying means at said common level; driving means for said first and second conveying means and said blocking devices for moving said blocking devices to permit the transfer of articles from said first conveying means to their corresponding article carriers; transfer means to transfer articles from said article carriers to said second conveying means; and means to prohibit the transfer of articles from said article carriers except when said article carriers are in juxtaposition with said conveying means.

References Cited in the file of this patent

UNITED STATES PATENTS

| | | |
|---|---|---|
| 504,394 | Maddock | Sept. 5, 1893 |
| 1,613,552 | Armstrong | Jan. 4, 1927 |